US006934247B2

United States Patent
Bhattal et al.

(10) Patent No.: US 6,934,247 B2
(45) Date of Patent: Aug. 23, 2005

(54) RECOVERY FOLLOWING PROCESS OR SYSTEM FAILURE

(75) Inventors: Amardeep Singh Bhattal, Southampton (GB); Morag Ann Hughson, Southampton (GB); Neil Kenneth Johnston, Southampton (GB); Anthony John O'Dowd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 09/844,002

(22) Filed: Apr. 27, 2001

(65) Prior Publication Data

US 2002/0064126 A1 May 30, 2002

(30) Foreign Application Priority Data

Nov. 24, 2000 (GB) ............................................. 0028688

(51) Int. Cl.[7] ................................................. H04J 3/14
(52) U.S. Cl. ..................................... 370/216; 709/203
(58) Field of Search ................................. 370/216, 217, 370/219, 220, 221, 225, 227, 228, 242, 248; 709/203, 208, 211, 213, 216, 217, 248, 239

(56) References Cited

U.S. PATENT DOCUMENTS

| 5,652,908 A | * | 7/1997 | Douglas et al. ................. 714/4 |
| 5,797,005 A | | 8/1998 | Bahls et al. ................. 395/680 |
| 5,887,168 A | * | 3/1999 | Bahls et al. ................. 719/314 |

FOREIGN PATENT DOCUMENTS

| EP | 0330178 | 2/1989 | ........... H04B/7/185 |
| EP | 3840570 | 6/1989 | ........... H04L/11/00 |
| GB | 2004673 | 9/1978 | ........... G06F/11/00 |
| JP | 11-112609 | 4/1999 | ........... H04L/29/14 |
| JP | 09-319708 | 2/2000 | ........... G06F/15/00 |
| JP | 2000-57095 | 2/2000 | ........... G06F/15/00 |

OTHER PUBLICATIONS

IBM Manual, "MQSeries Intercommunication, " form No. SC88-775-02, published by IBM Japan, Apr. 30, 1999, pp. 3-12.
U.S. Appl. No. 60/220,685, filed Jul. 25, 2000, Kettley et al.
PUPA: 11-112609, Apr. 23, 1999, Y, 1,4,6-11.
PUPA: 2000-57095, Feb. 25, 2000, Y, 1-4,6,7,10.
"MQSeries Mutual communication" I.B.M JP, pp3-12, Apr. 30, 1999, N, 1,4,6,7,10.
PUPA:09-319708.

* cited by examiner

*Primary Examiner*—Wellington Chin
*Assistant Examiner*—Brenda Pham
(74) *Attorney, Agent, or Firm*—Gerald R. Woods

(57) ABSTRACT

Provided are methods, data communication apparatus and computer programs for managing communications between a remote communication manager and a set of communications managers in an associated group. The group of communication managers have shared access to resources which enable any communication manager in the group to recover from failures experienced by another communication manager in the group. In particular, recovery of failed inbound and outbound channels is achieved with the advantage of improved availability of data transmissions. Preferably, the recovery uses synchronization information to ensure that data is recovered to a consistent state to that channel recovery is achieved without loss of data integrity.

6 Claims, 5 Drawing Sheets

RECOVERY FOLLOWING PROCESS OR SYSTEM FAILURE

FIELD OF INVENTION

The present invention relates to recovery following process or system failures in a data communications network and in particular to recovery by a process or subsystem other than the one which experienced the failure, for improved availability.

BACKGROUND

Many existing messaging systems use a single messaging manager to manage the transmission, from a local system, of all messages which are destined for remote systems, and to handle receipt of all messages which are destined for the local system. An application program running on the local system which requires that a message be sent to a remote system connects to the local messaging manager and requests that it send the message to the required destination. This implies reliance on the availability of the single messaging manager for all communications. Any failure which affects that messaging manager has a significant effect on messaging throughput, since a full rollback and restart of the messaging manager is required before communications can resume.

It is known from U.S. Pat. Nos. 5,797,005 and 5,887,168 to provide a system allowing messages to be processed by any of a plurality of data processing systems in a data processing environment. A shared queue is provided to store incoming messages for processing by one of the plurality of data processing systems. A common queue server receives and queues the messages onto the shared queue so that they can be retrieved by a system having available capacity to process the messages. A system having available capacity retrieves the queued message, performs the necessary processing and places an appropriate response message back on the shared queue. Thus, the shared queue stores messages sent in either direction between clients requesting processing and the data processing systems that perform the processing. Because the messages are enqueued onto the shared queue, the messages can be processed by an application running on any of a plurality of systems having access to the queue. Automatic workload sharing and processing redundancy is provided by this arrangement. If a particular application that is processing a message fails, another application can retrieve that message from the shared queue and perform the processing without the client having to wait for the original application to be restarted.

U.S. patent application Ser. No. 60/220,685 (attorney reference GB9-2000-032), which is commonly assigned to the present application and is incorporated herein by reference, discloses improved recovery from connection failures between a queuing subsystem and a shared queue, such failure being caused either by communications link failure, or failure of the queuing subsystem. Message data in a shared queue is communicated between message queuing subsystems by means of data structures contained in a coupling facility. A connection failure to the coupling facility is notified to queuing subsystems other than the one which experienced the failure, and these queuing subsystems then share between them the recovery of active units of work of the failed subsystem.

Although the solution of U.S. Ser. No. 60/220,685 provides significantly improved transactional recovery within a group of queuing subsystems, it does not address the problems of how to resume communications with communication managers outside the group in the event of failures affecting in-progress communications.

SUMMARY OF INVENTION

According to a first aspect of the present invention, there is provided a method of managing communications between a set of communication managers and a remote communication manager, the method comprising: starting a communication channel between a first communication manager of the set and the remote communication manager for transmitting data from a data storage repository to the remote communication manager, the data storage repository being accessible by any one of the set of communication managers; storing state information for the communication channel in a storage repository accessible by any one of the set of communication managers (which may be the same data storage repository from which data is transmitted); in response to a failure affecting the first communication manager, a second one of the set of communication managers using the stored channel state information to start a new channel instance and resuming transmission of data from the data storage repository to the remote communication manager via the new channel instance.

The invention uses shared access to communication resources (stored data and communication mechanisms) to enable members of a group of associated communication managers to recover from failures of communications with remote communication managers, thereby achieving improved availability of data transmissions. This advantage of increased availability is achieved without reliance on redundant resource managers which are, in the prior art, typically required to be kept out of operational use in the absence of failures and yet to be kept consistent with their associated resource manager. Maintaining such redundancy is expensive.

The stored channel state information preferably includes an identification of the communication manager which currently has control of the channel. Additionally, the state information preferably includes an indication of the status of the channel (for indicating whether it was, for example, running, attempting to run or stopped when a failure occurs). Thus, each active communication manager within the group is able to determine which channels should be recovered when a first communication manager experiences problems, and what state they should be recovered to.

The information stored for a channel preferably also includes synchronisation data for data transmissions via the channel, to enable synchronised recovery by other communication managers. This synchronisation data may be part of the state information or stored separately from it.

Each communication manager of the set preferably holds or has access to a copy of a channel definition for each channel which is active and this is used together with the stored state information to enable a communication manager other than the first to start a new channel instance and resume data transmissions.

A preferred method for recovery from communication failures includes: preventing a second instance of a communication channel from being started (for example, using locks) while a first instance of the channel is in active use by the first communication manager; in response to determining that the first communication channel instance has experienced a failure, starting a second instance of the channel using the channel definition and current channel state information; and transmitting data using the second channel instance. Avoiding multiple concurrent instances of a channel not only simplifies avoidance of resource-update conflicts, but may also be advantageous for avoiding the costs of multiple connections if, for example, the remote communication manager is an external service provider with significant associated connection charges.

The data storage repository is preferably a shared-access message queue. The plurality of communication managers are preferably a group of queue managers having shared access to one or more message queues (referred to hereafter as a "queue sharing group") or communication manager components within or associated with such queue managers. Alternatively, the communication managers could be any computer program or data processing system component which performs communication management operations.

The invention according to a preferred embodiment enables queue managers in a queue sharing group (or their associated communication manager components) to take over message transmission from a shared queue when a first queue manager experiences a failure. A new instance of a failed channel is started using channel definition parameters and current channel state information. Such 'peer' recovery by queue managers in a queue sharing group provides improved availability message transmission.

According to a preferred embodiment of the invention, recovery from failures of outgoing message transmissions is achieved as follows. Each queue manager in a queue sharing group has access to a shared outgoing-message queue. Each of these queue managers (or its communication manager component) is provided with a copy of a definition of a sender channel between the shared queue and a destination queue manager, such that each queue manager in the queue sharing group (or its communication manager component) is able to start an instance of the channel. Only a single channel instance is allowed to be active at any one time. Certain state information for a channel is stored whenever the channel is active, and a subset of that state information is held in shared access storage so as to be available to any queue manager within the queue sharing group. If the queue manager which is using a channel experiences a failure, another queue manager or communication manager component in the queue sharing group uses the state information held in shared access storage together with its copy of the channel definition to start a new instance of the channel. Thus, a queue manager continues message transmission on behalf of the queue manager which experienced the failure.

In a second aspect, the invention provides a data communications system comprising: a data storage repository accessible by any one of a set of communication managers; a set of communication managers, each adapted to start an instance of a communication channel for transmitting data from the data storage repository to a remote communication manager, and each adapted to transmit data via said communication channel; a storage repository for storing current state information for the communication channel, the storage repository being accessible by any one of the set of communication managers; wherein the set of communication managers are responsive to a failure affecting a first communication manager of said set which has a first active instance of a communications channel, to start a second instance of the channel using the stored current channel state information and to resume transmission of data from the data storage repository to the remote communication manager via the second channel instance.

In a third aspect, the invention provides a computer program comprising computer readable program code for controlling the operation of a data communication apparatus on which it runs to perform the steps of a method of managing communications between a set of communication managers and a remote communication manager, the method comprising: starting a communication channel between a first communication manager of the set and the remote communication manager for transmitting data from a data storage repository to the remote communication manager, the data storage repository being accessible by any one of the set of communication managers; storing state information for the communication channel in a storage repository accessible by any one of the set of communication managers (which may be the same data storage repository from which data is transmitted); in response to a failure affecting the first communication manager, a second one of the set of communication managers using the stored channel state information to start a new channel instance and resuming transmission of data from the data storage repository to the remote communication manager via the new channel instance.

In a further aspect of the invention, inbound communication flows may be accepted by any one of the set of communications managers, and any one of these communication managers may automatically replace any other communication manager within the set which had been receiving messages and can no longer do so. The peer recovery of both inbound and outbound communication channels is preferably transparent to the remote communication manager which views the set of communication managers as a single entity.

A preferred embodiment according to this aspect of the invention comprises a method of managing communications between a set of communication managers and a remote communication manager, including: starting a first instance of a communication channel between a first communication manager of the set and the remote communication manager for receiving data from the remote communication manager; preventing a second instance of the communication channel from being started while the first instance of the channel is in active use by the first communication manager; in response to a channel start request from the remote communication manager following a failure which affects the first communication manager, starting a second instance of the channel between a second one of the set of communication managers and the remote communication manager and resuming data transmissions from the remote communication manager via the new channel instance.

In a further aspect of the invention, there is provided a data communications system comprising: a data storage repository accessible by any one of a set of communication managers; a set of communication managers, each adapted to start an instance of a communication channel for transmitting data from the data storage repository to a remote communication manager, and each adapted to transmit data via said communication channel; a storage repository for storing synchronisation information for data transmissions via said communication channel, the storage repository being accessible by any one of the set of communication managers; wherein the set of communication managers are responsive to a failure affecting a first communication manager of said set which has a first active instance of a communications channel, to recover said first communication manager's data transmissions to a consistent state using said stored synchronisation information, thereby to enable transmission of data from the data storage repository to the remote communication manager to be resumed.

BRIEF DESCRIPTION OF DRAWINGS

Embodiments of the invention will now be described in more detail, by way of example, with reference to the accompanying drawings in which.

DETAILED DESCRIPTION OF PREFERRED EMBODIMENTS

In distributed message queuing inter-program communication, message data is sent between application programs by means of message queue managers that interface to the application programs via interface calls invoked by the application programs. A message queue manager manages a set of resources that are used in message queuing inter-program communication. These resources typically include:

Page sets that hold object definitions (including queue definitions) and message data;

Logs that are used to recover messages in the event of a queue manager failure;

Processor storage;

Connections through which different application environments can access the message queue manager APIs;

A queue manager channel initiator, which allows communication between queue managers on the same and other systems. This will be described in more detail later.

Queue managers are preferably implemented in software. In certain environments, such as in a data processing system running IBM Corporation's OS/390 operating system, a queue manager can run as a named subsystem using operating system data sets to hold information about logs, and to hold object definitions and message data (stored in page sets). Application programs can connect to the queue manager using its subsystem name.

Figure 1:
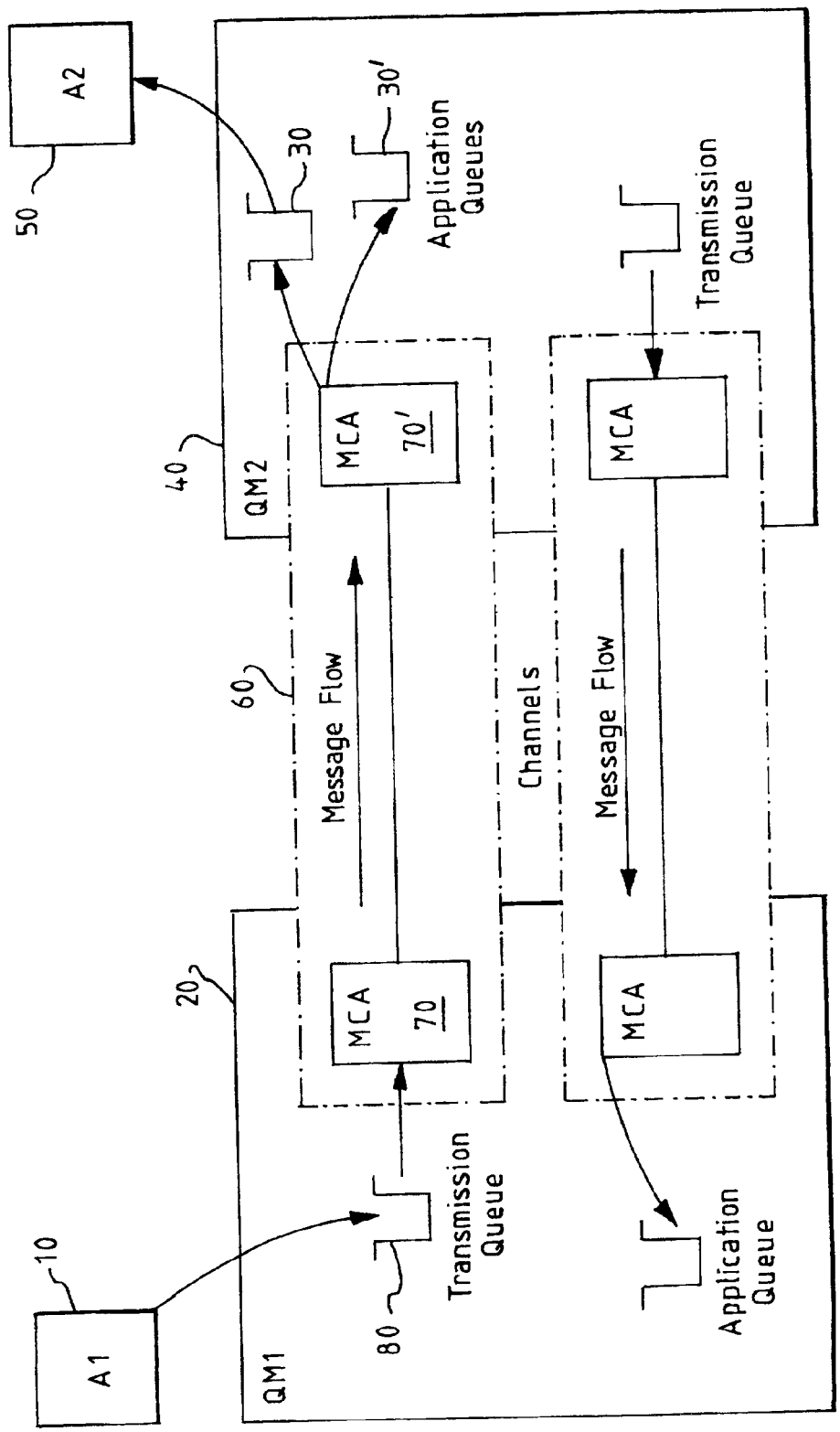
FIG. 1 is a schematic representation of the sending of messages between queue managers via channels in a messaging and queuing inter-program communication environment, as is known in the art.

In an example distributed message queuing environment, such as implemented by IBM Corporation's MQSeries products and represented in FIG. 1, a sender application program 10 puts a message onto a local queue managed by its local queue manager 20. If the target application program is also on the local system, then the local queue is the destination queue for the message and the application retrieves the message from this queue when it is ready to process the message. If the target application program is remote from the sender, the local queue is a transmission queue 80 and a network of queue managers handles transmission of the message across the network to a remote destination queue 30 managed by a remote queue manager 40. Transmission queues are a special type of local queue on which messages are stored until they can be successfully transmitted to another queue manager and stored there. The queue managers handle the complexities of the network communications including interoperability between heterogeneous systems and transferring messages via one or more intermediate queue managers. The remote target application program 50 retrieves the message from the destination queue 30 (its input queue) when it is ready.

Messages are transmitted between queue managers on a channel 60 which is a one-way communication link between two queue managers. Software which handles the sending and receiving of messages is called a message channel agent (MCA) 70. To send a message from queue manager QM1 to queue manager QM2, a sending message channel agent 70 on queue manager QM1 sets up a communications link to queue manager QM2, using appropriate transmission queue and channel definitions. A receiving message channel agent 70' is started on queue manager QM2 to receive messages from the communication link. This one-way path consisting of the sending MCA 70, the communication link, and the receiving MCA 70' is the channel 60. The sending MCA 70 takes the messages from the transmission queue 80 and sends them down the channel to the receiving MCA 70'. The receiving MCA 70' receives the messages and puts them on to the destination queues 30,30'.

FIG. 1 shows these relationships between queue managers, transmission queues, channels and MCAs.

In the preferred embodiment of the invention, the sending and receiving MCAs associated with a particular queue manager can all run inside a channel initiator component (or 'mover') which uses an address space under the control of the queue manager. Hence it is the channel initiator which manages communications with other queue managers. There is only a single channel initiator connected to a queue manager. There can be any number of MCA processes running concurrently inside the same channel initiator. Channels may be started dynamically by a channel initiator in response to arrival of messages on a transmission queue that satisfies some triggering criteria for that queue.

Figure 2:
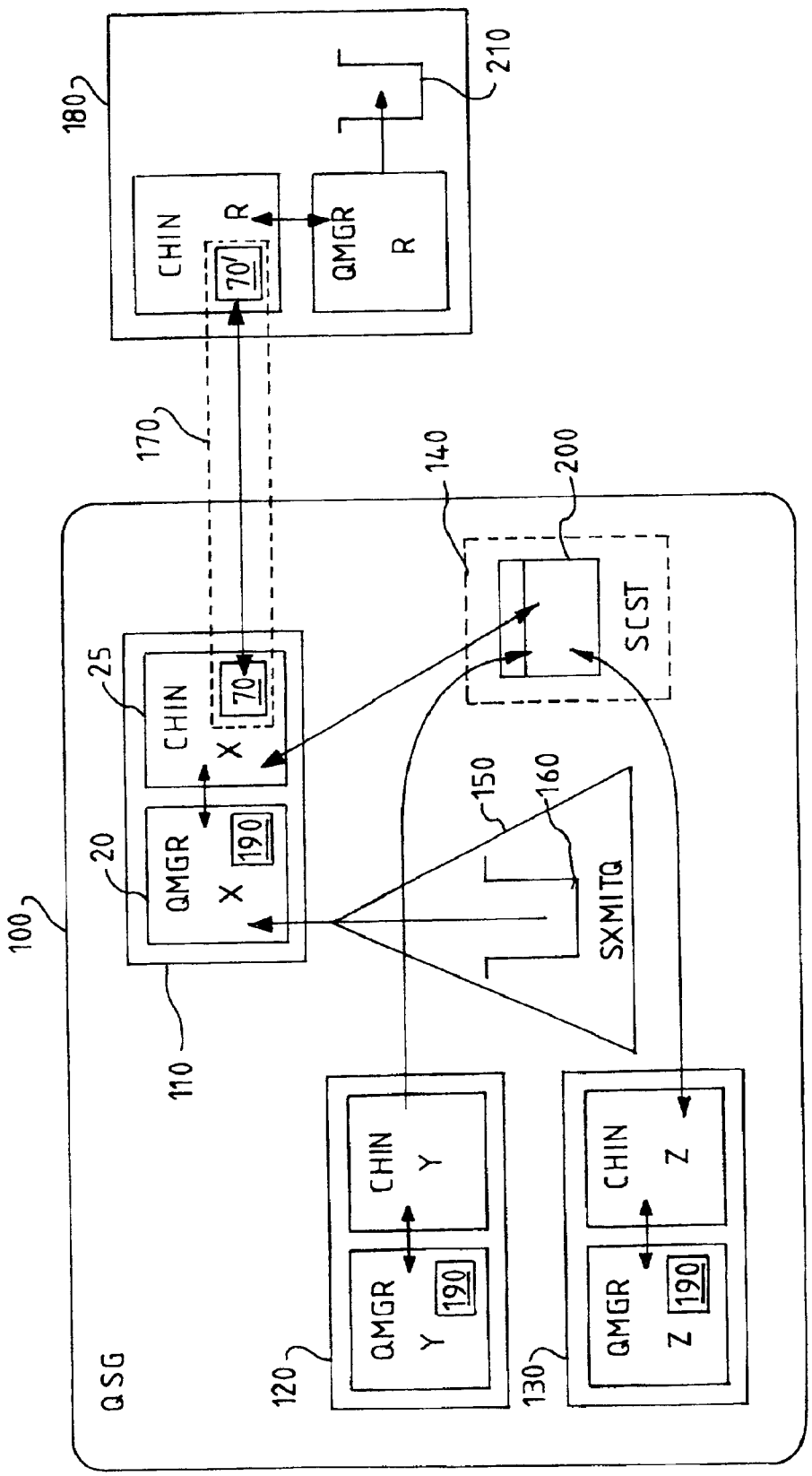
FIG. 2 is a representation of the components involved in communication via an outbound communication channel according to an embodiment of the invention.

Referring to FIG. 2, a queue sharing group 100 is a number of queue managers 110, 120, 130 (for example running within a single OS/390 sysplex) that are able to access the same message queuing object definitions and message data. Queue managers elsewhere in the network can view the group as a single entity, since a single generic address can be used for connecting to any queue manager in the group. Each queue manager in the queue-sharing group 100 listens for inbound session requests on an address that is logically related to the generic address.

Within a queue-sharing group, the shareable object definitions are stored in a shared database 140 (such as IBM Corporation's DB2 database) and the messages in shared queues are held in one or more coupling facilities 150 (for example, in OS/390 Coupling Facility list structures). The shared database 140 and the Coupling Facility structures 150 are resources that are shared between several queue managers 110, 120, 130. A Coupling Facility can be configured to run on a dedicated power supply and to be resilient to software failures, hardware failures and power-outages, and hence enables high availability of its stored messages.

The queue managers of the queue sharing group and their resources are associated in such a way that the transmission of messages is not dependent on the availability of a single queue manager. Any of the queue managers of the queue sharing group can automatically replace any other queue manager that had been transmitting messages but is no longer able to do so. When one queue manager experiences a failure, message transmission resumes without any operator or application intervention.

Additionally, inbound message flows may also be accepted by any of the queue managers of the queue sharing group, and any one of these queue managers may automatically replace any other queue manager within the group that had been receiving messages but can no longer do so.

A more reliable outbound and inbound messaging service is thus achieved than would be possible with a stand-alone queue manager. This will now be described in more detail with reference to FIGS. 2–5.

In a queue-sharing group, transmission queues 160 may be shared by the queue managers 110, 120, 130 within the group. Any queue-sharing group queue manager can access the shared transmission queue 160 to retrieve messages and send them to a remote queue manager 180.

Sender channels are defined to send messages placed on a particular transmission queue to a remote queue manager. A shared sender channel is a channel that is defined to send messages placed on a shared transmission queue. Typically, identical shared sender channel definitions 190 will exist on all the queue managers in the queue-sharing group, allowing any of these queue managers to start an instance of the channel.

Various pieces of information about the channel (state information) are stored to enable the channel to run. A subset of this state information is held in a shared repository 200 for shared channels (i.e. it is accessible to any of the queue-sharing group queue managers). This shared repository 200 is known as the shared channel status table, and the information it contains includes: the last time the information was updated; the channel name; the transmission queue name (blank in the case of an inbound channel); the remote queue manager name (the connection partner for this channel); the owning queue manager (which is running the channel instance); the channel type (for example sender or receiver); channel status (running, stopped, etc); remote machine address; and possibly other implementation-specific state information.

In the event of failure, it can be determined from the shared channel status table which channels were being run by the now failed queue manager and channel initiator pair, and recovery can be coordinated when there are multiple parties performing the recovery process. This will be described further below.

Updates to any channel status entries in this table can only occur via compare-and-swap logic. That is, as well as supplying the entry as desired after the update (the after-image), the value of the entry before the update (the before-image) must also be supplied or the update attempt will be rejected. The after-image replaces the before-image if the before-image is found in the table, otherwise no change takes place.

High availability message transmission from the queue sharing group is achieved as follows.

As described above, the portion of a queue manager 20 responsible for message transmission is the channel initiator 25. There is one channel initiator per queue manager and so the queue sharing group comprises a number of queue manager and channel initiator pairs (represented in FIG. 2 as X, Y and Z). Each of these pairs has access to a shared resource which holds information relating to the shared channels running in a queue-sharing group. Only one channel initiator manages the transmission of messages from a shared transmission queue 160 at any one time, and it uses only one sender channel instance 170 for that transmission queue 160. While that channel instance is active the shared transmission queue is locked by the channel initiator 25 managing the channel instance (while the lock is held, no other channel initiators may retrieve messages from the queue). An entry is created in the shared channel status table 200 for the channel instance, and is updated to reflect that the channel is active, and the name of the channel initiator 25 (which is also the name of the associated queue manager 20) managing the channel is also stored. Since the transmission queue 160 is shared, any of the queue manager plus channel initiator pairs in the queue-sharing group may run a channel instance that sends messages from a shared queue which currently has no channel instance running from it.

Messages are transferred from the queue-sharing group to a remote queue manager (which is not a member of the queue-sharing group) as follows. One of the queue-sharing group channel initiators, say X, runs a channel instance 170 to the remote channel initiator R of queue manager 180. The channel definition 190 details how to contact the remote channel initiator, and which shared-access transmission queue to retrieve messages from to send across the channel. So, channel 170 is a communications link between X and R, used to send messages residing on a transmission queue 160. The channel initiator X requests its associated queue manager component X to retrieve messages from the transmission queue 160 (sxmitq in FIG. 2), these messages are then handed over to the channel initiator X which sends them across the channel. The remote channel initiator R, receives the messages, hands them over to its associated queue manager R, which then places them on some destination queue 210 accessible to it.

Four failure scenarios are detected and handled.

Shared channel status table connectivity failure (inability to update shared channel state).

Communications subsystem failure (inability to communicate with the remote system).

Channel initiator failure.

Queue manager failure.

Failure scenarios 1 and 2 are handled by the channel initiator unlocking the transmission queue, and periodically attempting to re-start the channel on a different queue-sharing group queue manager by issuing start requests for the channel, directed to a suitable queue-sharing group queue manager which is selected using workload balancing techniques. Suitable workload balancing techniques are well known in the art. When a queue-sharing group queue manager receives such a start request, an attempt is made to obtain a lock on the transmission queue and, if successful, a new channel instance is started, the shared status table is updated as required, and message transmission resumes.

In the preferred embodiment of the invention, channel initiator failure (scenario 3) may occur independently of queue manager failure because the channel initiator runs as a separate task (effectively a separate program) paired with its associated queue manager. In the event of channel initiator failure, a failure event is logged with the queue manager paired with the channel initiator and this queue manager handles channel recovery:

The paired queue manager, say X, queries the shared channel status table to obtain a list of all the entries for the channel instances the failed channel initiator, X, was managing (i.e. all entries with the owning queue manager and channel initiator name set to that of the failed queue manager and channel initiator—since a queue manager and its associated channel initiator share the same name).

It is confirmed that the failed channel initiator is still inactive, so that the list of entries obtained is guaranteed to be a list of channels being managed when a failure of the channel initiator occurred.

Each outbound channel in the list is then processed by examining the state and type of the channel, and performing the necessary recovery action. This preserves the state of any explicitly stopped channels (which require a manual start command to be issued before the channel is allowed to transfer any more messages), starts any outbound channels that were running or in the process of attempting to run, and removes any other entries (if any).

An attempt is made to take ownership of each channel. This means that the relevant shared channel status entry is updated using the compare-and-swap logic described previously, with the before-image set to that found in the list of bad channels, and with the after image containing the name of the queue manager performing recovery. In the scenario of self-recovery by the paired queue manager X, this updating of the shared channel status table entry leaves the name unchanged but changes the state of a channel that was running at the time of the failure to indicate that the channel is in recovery (no longer running). Secondly, if ownership is obtained successfully (i.e. the update succeeds, as it should in this self-recovery scenario), a start request is issued for the channel, directed at a suitable queue manager within the queue sharing group. This causes an active channel initiator within the group to start a new channel instance, to update the owner to its own name and to update the state to running. The use of compare-and-swap logic in this solution avoids duplication of recovery processing and prevents multiple start requests being actioned for the same channel (e.g. The first of a set of issued requests may be actioned, whereas subsequent requests produce error messages warning that the channel is already running).

If a queue manager fails (scenario 4) this will necessarily mean that the paired channel initiator will also fail. This triggers the failure event being logged at all currently active queue sharing group queue managers. Each of these queue managers (Y and Z) then enters similar processing to that described above, to implement peer recovery. When there are multiple queue managers performing recovery, an attempt to take ownership of a channel issued by a certain queue manager may fail because another queue manager has already processed the entry and changed the owning queue manager name. Only one start request is actioned for a channel, but different queue managers may recover different channels.

At channel initiator start-up time, recovery processing is entered first for the starting channel initiator (to ensure that any channels not yet recovered are recovered), then for any other inactive channel initiators (in case the starting channel initiator is the first active channel initiator in the queue sharing group, following the failure of other previously running queue-sharing group channel-initiators).

We achieve high availability message transmission inbound to the queue sharing group as follows.

Inbound channels are recovered at the same time as outbound channels are recovered, but have their entries removed from the shared status table. This allows the sending remote queue manager to re-establish a connection to the queue sharing group, since the sending end of the communications channel will attempt to reconnect to the queue sharing group upon channel failure. No state information is held at the queue-sharing group end for an inbound failed channel (i.e. It is deleted from the shared status table after recovery processing). Therefore a new inbound channel may be established with any of the remaining queue sharing group queue managers. It is possible to delete the inbound channel state information because the resource holding the information is shared and the information held distinguishes which channels were inbound (via the channel type) and which channels were running on the now failed queue manager and channel initiator (via the owning queue manager name entry).

A further significant advantage of preferred embodiments of the present invention is that, in addition to recovery of channels, the data being transmitted across the channels is also recovered to a synchronous state. This synchronised recovery aspect of the present invention is applicable to any transactional transfer of messages between local and remote communication managers. This will now be described in more detail.

Figure 4:
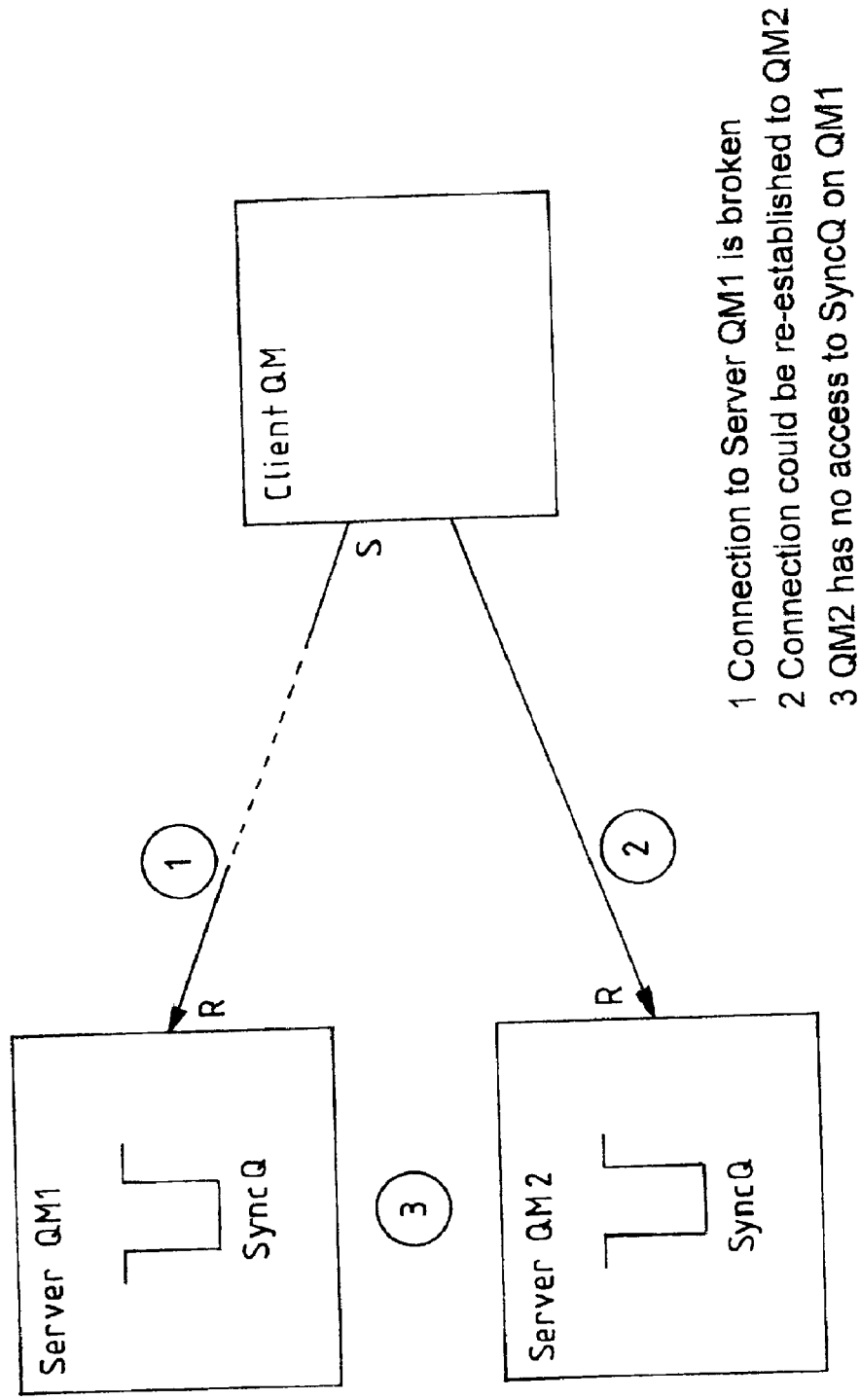
FIG. 4 shows the problem of inability to access a remote queue's synchronisation information when the remote queue manager fails.

It is known in the art for messages to be transferred between local and remote queue managers in batches under transactional control. Synchronisation information is held on a local synchronisation queue to facilitate this transactional control. A problem with known solutions is that if the remote queue manager should fail during message transfer, the synchronisation information held on the remote queue manager becomes inaccessible. This makes it difficult to provide assurance of the fact that the messages have been successfully transferred to the failed remote queue manager. This problem is represented in FIG. 4.

Figure 5:
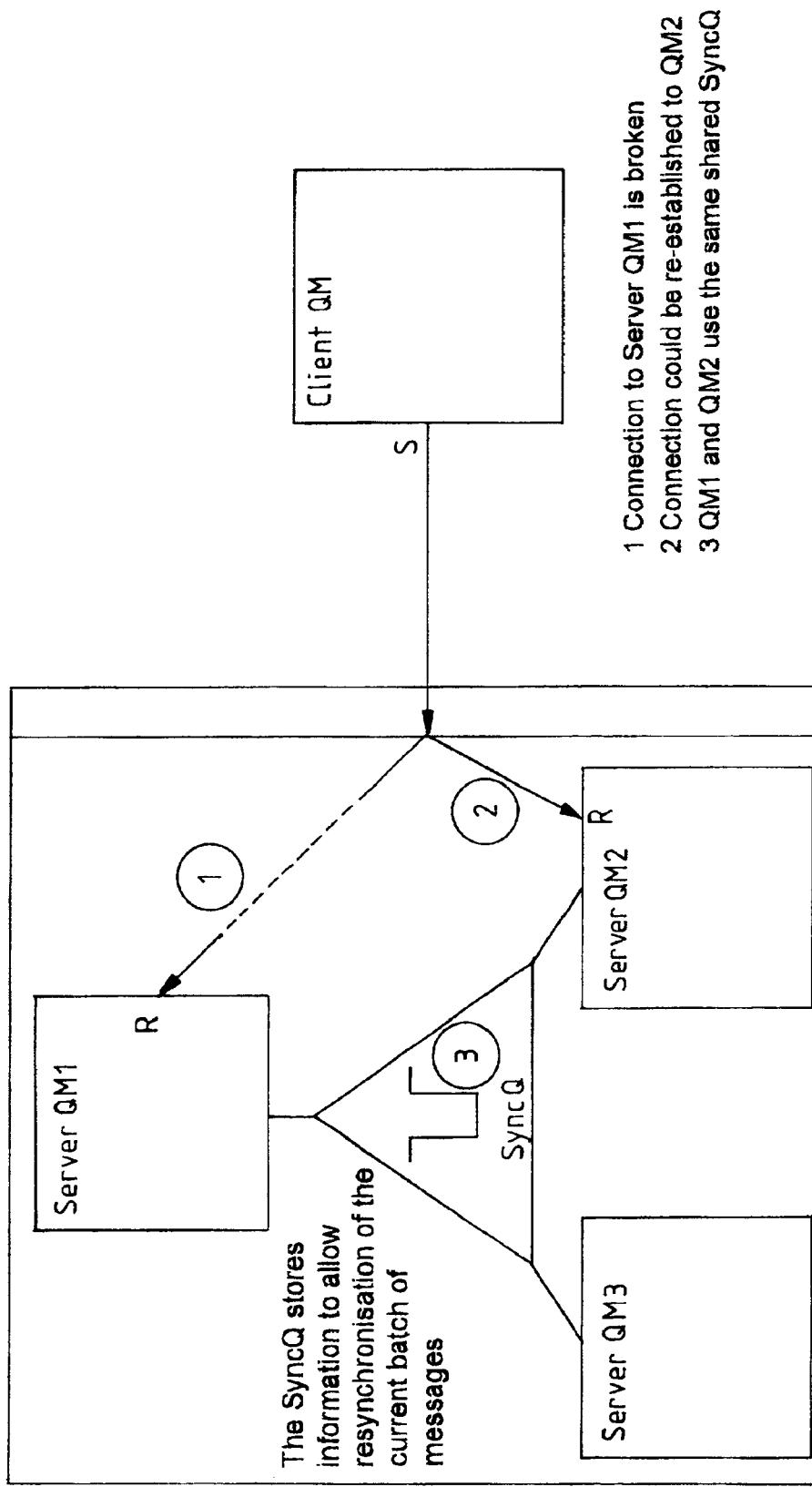
FIG. 5 shows how shared access resources can be used according to an embodiment of the present invention to enable synchronised recovery of channels.

According to an aspect of the present invention, the capability to group queue managers into a queue sharing group (QSG), with the queue managers sharing queues held in a common shared storage facility (for example a Coupling Facility) is used to solve this problem. Client applications or client queue managers that reside outside the QSG, may connect, via a channel, to any queue manager in the QSG to transfer messages to the shared queues. Messages are transferred over the channel in batches under transactional control. A shared synchronisation queue, held in the Coupling Facility and accessible by all the queue managers in the QSG, is used to facilitate this transactional control. This is represented in FIG. 5. If a queue manager in the QSG should fail, then the client application or the client queue manager can re-establish connectivity to a remaining active queue manager in the QSG. Since this other queue manager can access the shared synchronisation queue, it has the ability to resynchronise the channel with the partner. Therefore, providing assurance of message transfer.

The resynchronisation is made possible by recording a message on a shared synchronisation queue (the SYNCQ) which contains information that will identify the client queue manager as well as an identifier that records the last committed unit of work.

Following a failure of a queue manager in a QSG, a client or client queue manager may find itself in a state where it does not know if it needs to resend the last batch of messages. Typically, the channel that was being used for message transfer will enter a state of retry when the failure occurs. On next retry, connectivity will be re-established between the client or client queue manager and a remaining active queue manager in the QSG. During session/connectivity re-establishment, this other queue manager in the QSG will access the shared SYNCQ to determine the last known good state, and inform the client or client queue manager if it needs to resend the last batch sent, or if the last batch sent has already been received and transactionally processed successfully. Once this resynchronisation has taken place, the channel can be used for further message transfer. Any subsequent synchronisation information will continue to be written to the shared SYNCQ and used in the event of any future failures of queue managers in the QSG.

There are some significant advantages associated with the ability of a queue-sharing group to appear to the network as a single entity: these being the potential for large increases in capacity, scalability, availability and fault-tolerance. However, a queue manager outside the queue-sharing group may sometimes wish to communicate with a single queue manager member of the queue-sharing group, and sometimes to communicate with the group as a single entity. Both options are enabled as follows:

Each queue manager has a unique LOCAL NAME associated with it. An external queue manager (QM) may wish to communicate directly with a queue manager who is a member of the queue-sharing group and so target its communication at a local portal associated only with that queue manager. In this case the external queue manager is informed of the LOCAL NAME of the queue manager.

The queue-sharing group is identified by a GROUP NAME. A logical, generic portal is defined. It is this portal which is the target of communications from the external queue manager (QM) when it wants to connect to the queue-sharing group. Each queue manager in the queue-sharing group has a group portal (GP), through which, if communications are established, the shared QM—QSG class of service is provided. Each group portal of each queue manager in the queue-sharing group is logically connected to the generic portal. When the external queue manager wishes to communicate it uses the generic portal and the external queue manager is informed of the GROUP NAME of the queue-sharing group.

There are several mechanisms by which the use of the generic portal causes a session to be allocated to the group portal of an individual queue manager. These are described briefly below, though the architecture permits any underlying technology to be used.

Name resolution. An external name service maps all possible group portals to the generic portal. When an external queue manager wishes to communicate to the generic portal, it passes this name to the name service provider, which then returns one of the available group portals. The external queue manager then establishes a session with this queue manager explicitly.

Session passing. A communications link is established with a physical portal which represents the generic portal. The session is then passed to one of the group portals of one of the queue managers in the queue-sharing group.

Session re-establishment. If an outbound session from a queue manager outside the QSG to a queue manager in the QSG is lost due to a failure of the queue manager in the QSG, the outbound channel at the queue manager outside the QSG enters a state of retry. On next retry, a session is re-established between any remaining active queue manager in the QSG.

In prior art solutions, a local queue manager can establish sessions with one or more remote queue managers but each remote queue manager appears as a single entity to the local queue manager such that the capacity of each remote queue managers is independently available for session establishment, and if a remote queue manager should fail then the sessions between the local queue manager and the remote queue manager are lost.

With the introduction of queue managers in a queue sharing group, a set of queue managers in a queue sharing group (QSG) have the ability to appear to the network as a single entity. This provides the ability for a large increase in:

capacity and scalability—all queue managers in the QSG are available for session establishment with queue managers outside the QSG;

availability and fault tolerance—if a queue manager within the QSG should fail, resulting in a loss of sessions between it and a queue manager outside the QSG, then any outbound channels from the queue manager outside the QSG will enter a state of retry. On next retry, a session can subsequently be established with any remaining active queue manager in the QSG. Therefore, any outage in session can be minimised.

Figure 3:
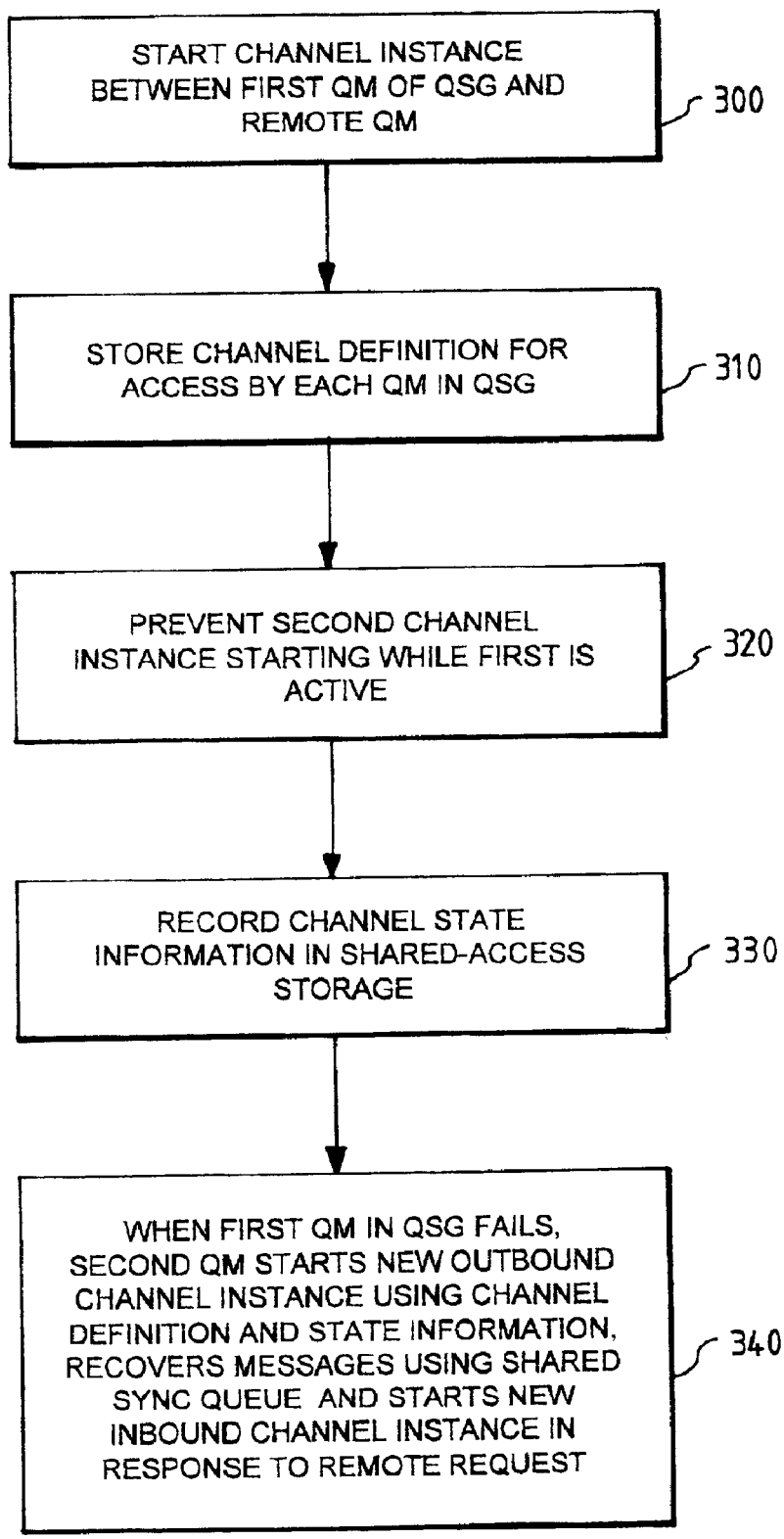
FIG. 3 is a representation of the steps of a method of managing communications according to an embodiment of the invention.

A summary of method steps of an embodiment of the invention, which incorporates each of the aspects described in detail above is shown in FIG. 3. It will be appreciated by persons skilled in the art that other combinations and sub-combinations of the described features of the different aspects of the invention are within the scope of the present invention.

FIG. 3 represents the following steps of a method of managing recoverable communications:

Start channel instance 300 between a first queue manager of the QSG and a remote queue manager, and transmit data via the channel;

Store channel definitions 310 for active channels so as to be accessible by each queue manager in the queue sharing group;

Prevent 320 a second channel instance from being started while a first instance is active;

Record 330 channel state information in shared-access storage;

When first queue manager or its communication manager component fails, start a second channel instance 340 between the remote queue manager and another queue manager in the QSG. For outbound channels, the new instance uses the stored channel state information and the stored channel definitions. The available queue managers in the QSG recover the failed channels using information in a shared-access synchronisation queue, start a new outbound channel instance for each failed outbound channel and, in response to start requests from the remote queue manager, start a new inbound channel instance for each failed inbound channel. Data transmission then continues via the new channel instances.

What is claimed is:

1. A method of managing communications between a set of communication managers and a remote communication manager, wherein the set of communication managers are a set of queue managers in a queue-sharing group, the method comprising:

starting a communication channel between a first communication manager of the set and the remote communication manager for transmitting data from a data storage repository to the remote communication manager, the data storage repository accessible to any one of the set of communication managers being a shared-access message queue from which any one of the set of queue managers can retrieve messages for transmission to remote queue managers;

storing state information for the communication channel in a storage repository accessible by any one of the set of communication managers;

storing state information for the communication channel in a storage repository accessible by any one of the set of communication managers; and in response to a failure which affects the first communication manager, a second one of the set of communication managers using the stored channel state information to start a new channel instance and resuming transmission of data from the data storage repository to the remote communication manager via the new channel instance.

2. A method of managing communications between a set of communication managers and a remote communication manager, the method comprising:

starting a communication channel between a first communication manager of the set and the remote communication manager for transmitting data from a data storage repository to the remote communication manager, the data storage repository accessible by any one of the set of communication managers;

storing state information for the communication channel in a storage repository accessible by any one of the set of communication managers;

storing state information for the communication channel in a storage repository accessible by any one of the set of communication managers;

in response to a failure which affects the first communication manager, a second one of the set of communication managers using the stored channel state information to start a new channel instance and resuming transmission of data from the data storage repository to the remote communication manager via the new channel instance; and storing synchronization information for data transmissions via said communication channel in a second storage repository accessible by any one of the set of communication managers; and in response to said failure, one of said set of communication managers recovering said first communication manager's data transmissions to a consistent state using the stored synchronization information.

3. A data communication system comprising:

a data storage repository accessible by any one of a set of communication managers;

a set of communication managers, each adapted to start an instance of a communication channel for transmitting data from the data storage repository to a remote communication manager, and each adapted to transmit data via said communication channel;

a storage repository for storing current state information for the communication channel, the storage repository being accessible by one one of the set of communication managers, wherein the set of communication managers are responsive to a failure affecting a first communication manager of said set which has a first active instance of a communication channel, to start a second instance of the channel using the stored current channel state information and to resume transmission of data from the data storage repository to the remote communication manager via the second channel instance;

a storage repository for storing synchronization information for data transmissions via said communication channel, the storage repository being accessible by any one of a set of communication managers;

wherein the set of communication managers are responsive to a failure affecting a first communication manager of said set which has a first active instance of a communication channel, to recover said first communication manager's data transmissions to a consistent state using said stored synchronization information, thereby to enable transmission of data from the data storage repository to the remote communication manager to be resumed without loss of data.

4. A data communication system according to claim 3, wherein the set of communication managers are a set of queue managers in a queue-sharing group and the data storage repository accessible to any one of the set for storing synchronization information includes:

a shared-access message queue from which any one of the set of queue managers can retrieve messages for transmission to remote queue managers; and a shared-access synchronization queue for storing said synchronization information.

5. A data communications system comprising:

a data storage repository accessible by any one of a set of communication managers;

a set of communication managers each adapted to start an instance of a communication channel for transmitting data from the data storage repository to a remote communication manager, and each adapted to transmit data via said communication channel;

a storage repository for storing synchronization information for data transmissions via said communication channel, the storage repository being accessible by any one of the set of communication managers;

wherein the set of communication managers are responsive to a failure affecting a first communication manager of said set which has a first active instance of a communication channel, to recover said first communication manager's data transmissions to a consistent state using said stored synchronization information, thereby to enable transmission of data from the data storage repository to the remote communication manager to be resumed.

6. A method of managing communications between a set of communication managers and a remote communication manager, the method comprising:

starting a first instance of a communication channel between a first communication manager of the set and the remote communication manager for receiving data from the remote communication manager;

preventing a second instance of the communication channel from being started while the first instance of the channel is in active use by the first communication manager;

in response to a channel start request from the remote communication manager following a failure which affects the first communication manager, starting a second instance of the channel between a second one of the set of communication managers and the remote communication manager and resuming data transmissions from the remote communication manager via the new channel instance.

* * * * *